United States Patent [19]
Myslinski et al.

[11] Patent Number: 5,870,514
[45] Date of Patent: Feb. 9, 1999

[54] OPTICAL IN-LINE ELEMENTS IN FIBER OPTIC SYSTEMS

[75] Inventors: Piotr Myslinski, Ottawa; Jacek Chrostowski, Gloucester, both of Canada

[73] Assignee: National Research Council of Canada, Ottawa, Canada

[21] Appl. No.: 61,669

[22] Filed: May 14, 1993

[51] Int. Cl.⁶ .................................................. G02B 6/38
[52] U.S. Cl. .............................................................. 385/56
[58] Field of Search .................... 385/53, 56, 60, 385/73, 31, 32, 33

[56] References Cited

U.S. PATENT DOCUMENTS

| | | | |
|---|---|---|---|
| 3,628,036 | 12/1971 | Humphrey | 385/31 X |
| 3,947,088 | 3/1976 | French | 385/31 |
| 4,088,389 | 5/1978 | Zucker et al. | 385/31 |
| 4,423,923 | 1/1984 | Frazier et al. | 385/51 X |
| 4,431,260 | 2/1984 | Palmer | 385/51 |
| 4,601,535 | 7/1986 | Tanaka et al. | 385/31 |
| 4,953,938 | 9/1990 | Buhrer et al. | 385/33 |
| 4,991,929 | 2/1991 | Bowen et al. | 385/56 X |
| 5,066,093 | 11/1991 | Greil et al. | 385/33 |
| 5,082,345 | 1/1992 | Cammons et al. | 385/60 |
| 5,093,877 | 3/1992 | Aita et al. | 385/33 X |
| 5,115,483 | 5/1992 | Morency et al. | 385/56 X |
| 5,231,684 | 7/1993 | Narciso, Jr. et al. | 385/33 X |

*Primary Examiner*—Akm E. Ullah

[57] ABSTRACT

An optical fiber connector is used as a means of carrying an optical element. The optical element is either permanently or removeably affixed to a planar end of the optical fiber connector with a suitable adhesive or gel. After the mating connector plugs are secured together, the affixed optical element is adjacent each end of each connector plug becoming in-line with the connector.

9 Claims, 3 Drawing Sheets

OPTICAL IN-LINE ELEMENTS IN FIBER OPTIC SYSTEMS

FIELD OF THE INVENTION

This invention relates to optical fiber connecting devices. More particularly, the invention relates to the incorporation of an optical element into an optical fiber connector.

BACKGROUND OF THE INVENTION

In the past, and at present, known methods of inserting an optical elements in-line with on optical fiber have been difficult and costly. Elements such as optical absorption filters, dielectric filters or mirrors, birefringement or polarization elements, saturable absorbers, light modulators as well as other elements can be inserted into an optical fiber. One common method of in-line insertion of elements requires cutting an optical fiber, polishing both cut ends of the fiber, and installing lenses to direct a beam coming out of one lens into the other. In operation, a collimated beam coming out of one end of the fiber propagates in free space and is focused by the other lens back into the second end of the optical fiber. An optical element is inserted into the space between the lenses as required. There are several disadvantages to his method. There is a high insertion loss due to the fact that much of the transmitted light is unguided; the arrangement is complex and is very sensitive to alignment; the beam diameter in the space between the lenses is large, therefore, the device is not suitable for non-linear applications.

In an attempt to overcome many of these disadvantages, S. Matsui et al. in Opt. 31, p. 1252, 1992 describe a technique for in-line insertion of a thin-plate optical element. The element is inserted into a precise narrow groove, cut across the fiber. This technique obviates most of the problems associated with a collimated beam device, however, it requires complex and expensive tools for cutting the narrow groove with micrometer accuracy.

U.S. Pat. No. 5,082,345 in the name of Cammons et al. issued Jan. 21, 1992, discloses an optical fiber connecting device including an attenuator element. Cammons discloses a cylindrical type optical fiber connector which includes an attenuator element that is capable of movement during the assembly of the connector. The connector includes a cylindrically shaped sleeve which has a longitudinally extending slot formed through the wall thereof. The attenuator element includes a rail comprising a head and neck which provides a path for the element to be moved by sliding along the slot in the ferrule sleeve of the connector which is parallel to the fiber axis. Cammons' attenuator arrangement requires that the connector coupling housing provide clearance for the attenuator support rail to ride in the slot of the sleeve. Although Cammons invention appears to perform its intended function, the arrangement is somewhat complex and is dependent on the type of optical connector used. The disk-like attenuator element must be shaped to have a rail which conforms to, slides within, and is supported by the slot and furthermore, the connector itself must have such a slot. Cammons' invention would not be suitable for use with many types of optical connectors.

It is therefore an object of this invention to provide a simple inexpensive method for in-line insertion of optical elements which obviates the aforementioned disadvantages.

SUMMARY OF THE INVENTION

In accordance with the invention, in an optical fiber connecting system having a first connector plug which terminates one optical fiber, a second connector plug which terminates another optical fiber, and an alignment adapter having a first port for receiving the first connector plug and a second port for receiving the second connector plug, the first and second plug ends being engageable with one another in an aligned, releasably locked position within the alignment adapter, there is provided, a method of incorporating into the optical system an optical element having first and second substantially parallel sides intermediate the two optical fibers comprising the steps of: providing the optical element; and, affixing the first side of the optical element to an end of the first connector plug.

In accordance with another aspect of the invention, there is provided an optical connector for modifying a characteristic of a signal propagating therethrough, comprising:

a first optical connector plug for terminating a first optical fiber;

a second optical connector plug for terminating a second optical fiber;

an alignment member for releasably locking with the first and second optical connector plugs and for coupling the connector plugs to one another; and, a planar optical element, affixed to an end of the first connector plug for modifying a characteristic of a signal propagating therethrough.

In accordance with another aspect of the invention there is provided, a kit comprising:

an optical fiber having a connector plug disposed at one end;

an other optical fiber having an other connector plug disposed at one end;

a plurality of optical elements suitable for affixing to an end of a connector plug for modifying a characteristic of an optical signal; and, an adhesive for affixing one of the optical elements to the end of one of the connector plugs.

BRIEF DESCRIPTION OF THE INVENTIONS

Exemplary embodiments of the invention will be described in conjunction with the drawings in which.

DETAILED DESCRIPTION

Figure 1:
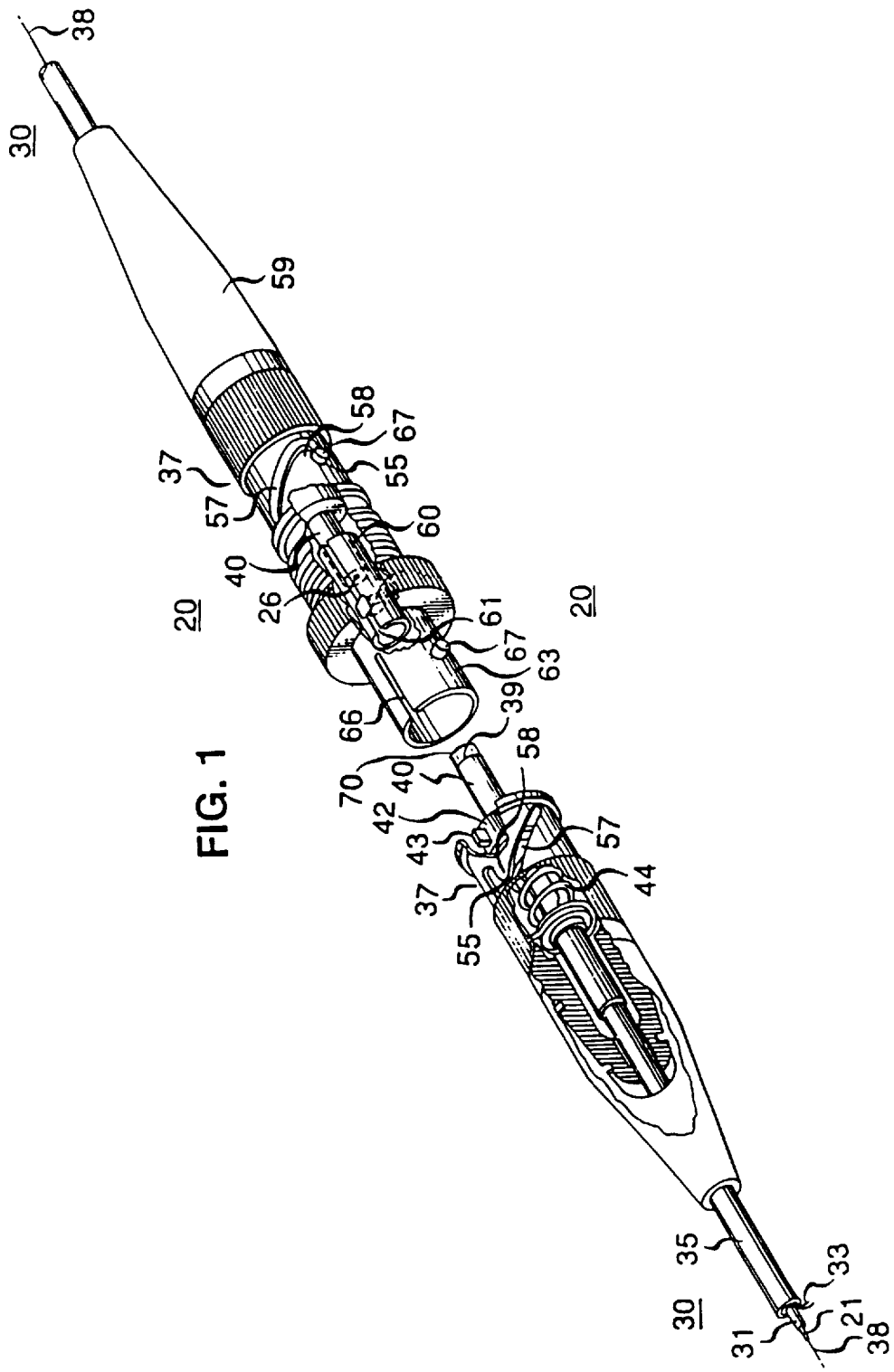
FIG. 1 is an oblique diagram shown partly in cross-section of a series connector having in optical element affixed to an end of a connector plug end.
Figure 2:
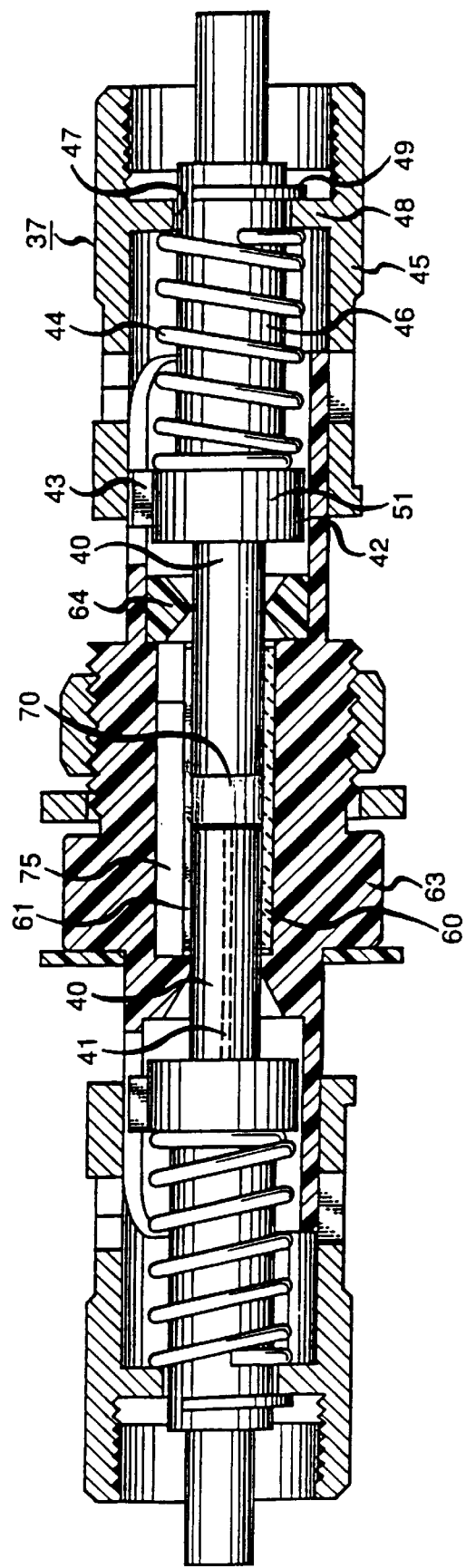
FIG. 2 is an elevational view partially in section of a series connector of this invention; and, FIG. 3 is an enlarged view of an optical fiber.
Figure 3:
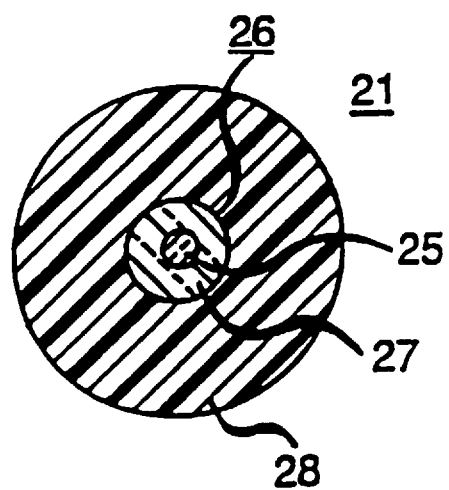

Referring to FIGS. 1, and 2 there is shown a portion of an optical fiber connector arrangement 20 for providing an optical fiber connection between two optical fibers. The connector 20 is exemplary and other connectors may be substituted into the arrangement of this invention. Each of two optical fibers 21—21 (See FIG. 3) to be connected includes a core 25 and a cladding 27, together designated 26, enclosed in a coating 28. The optical fiber may be enclosed in a tube of polyvinyl chloride (PVC) to provide what is referred to as a buffered fiber which may be terminated and connected in accordance with the invention. The connective arrangement of this invention also may be used to connect single fiber cables 30—30 (see FIG. 1) in which covering a tube 31 of PVC is a strength member 33 such as one made of aramid fibrous material, for example, and an outer jacket 35 which may be comprised of PVC. Referring to FIGS. 1 and 2, it can be seen that the connector 20 comprises two optical fiber terminations or plug assemblies, each designated generally by the numeral 37. Corresponding elements of the terminations 37—37 are identified with the same numerals. The connector 20 is such that longitudinal axes 38—38 of the terminations are coaxial. In addition to an end portion of an optical fiber 21, each termination 37 comprises an optical fiber terminus or plug 40, having a passageway 41 (see FIG. 2) and being made of a glass, plastic or ceramic material. The plug 40 has an outer diameter of about 2.5 mm. An end face 39 of the plug 40 includes an opening of the passageway 41.

In terminating a cable 30, the coating 28, as well as the tube 31, strength member 33 and outer jacket 35, is removed from an end portion of an optical fiber 21 prior to its terminations with a plug 40. Then the uncoated end portion of the optical fiber is inserted into the passageway 41 of each plug 40. The uncoated end portion of the optical fiber 21 is secured within the passageway 41 of the plug 40 and the end faces of the optical fiber are cleaved and polished.

Each termination also includes a connector body 42 or barrel (see FIGS. 1 and 2) made of plastic or metallic material, a compression spring 44 and a tubular cap 45 made of a plastic or metallic material. It should be observed that the plug 40, the connector body 42 includes a separate orienting alignment key 43 which projects radially from the longitudinal axis 38 and which can be installed an any one of a number of positions.

The connector body 42 includes a small diameter portion 46 (see FIG. 2) which extends through an opening 47 in an internally disposed collar 48 in the cap 45. A retaining washer 49 circumscribes the small diameter portion on the outer side of the collar. The spring 44 is disposed about the smaller diameter portion 46 of the connector body 42 between the collar and a large diameter portion 51. As a result of this arrangement the spring 44 biases the connector body 42 outwardly from the cable to hold the connector body within the cap 45 with respect to the connector body 42. In order to accomplish this, the cap may include a stud, not shown, which projects inwardly from said annular collar 48 into a camming race provided in the connector body.

Viewing again FIG. 1, it can be seen that the cap 45 includes a longitudinally extending slot 55 which at one end communicates with a circumferentially extending slot 57. The slot 57 is formed so that the tubular wall of the housing which defined it includes a latching projection 58. These slots 55 and 57 are used for securing a termination 37 to another portion of the connector 20. Completing the connector termination 37 there is a shown a portion 59 (see FIG. 1) which may extend from the cap 45 along the optical fiber cable in a conically shaped configuration. This portion of the connector 20 provides strain relief for the termination and ensures that the cable can withstand repeated bends in use after interconnection with another cable without undue stresses being imparted to the optical fibers.

The connector arrangement also includes an optical element 70 which is affixed to the end face 39 of the plug 40. The element may be permanently affixed to the end face 39 with a suitable adhesive such as lens bond optical cement or ultraviolet curing optical adhesive. It is preferable for the adhesive to be of the type having low absorption and scattering optical losses, as well as good bonding properties. Alternatively, an optical coupling gel or other grease-like optical couplant with suitable optical properties can be used to removeably affix an optical element to the end face 39 of the plug 40. Preferably, the optical element 70 is in the form of a disk and is selected of suitable thickness, flatness, surface finish, and parallelism to maintain fiber-end contact and to provide the desired optical properties. The element, for example, could be in the form of an optical absorption filter, a dielectric filter, a mirror, birefringement or polarization element, saturable absorber, light modulator or other element for insertion into an optical fiber.

In another embodiment of the invention, not shown in the figures, the optical element is directly deposited onto a connector end face 39 using conventional thin film deposition techniques. Although thin film may not be suitable for all optical elements envisaged, it is a highly desirable form of optical element since it introduces the smallest possible gap between the connector end faces resulting in low insertion loss.

Referring to FIG. 1, in operation, each connector plug is inserted into the sleeve 60. The plug 40 is inserted into the sleeve as the alignment key 43 is moved along the keyway 66. At the same time, each latching pin 67 enters and moves along a slot 57. At the end of the travel of the plug 40, each latching pin becomes disposed behind the latching projection 58. Ideally, to achieve minimum loss, the plugs 40—40 disposed within the sleeve 60 should have their longitudinal axes aligned and end faces of the fibers with the end faces 39—39 of the plugs contacting the optical element 70 which is affixed to one of the end faces 39. The outer surface of each plug 40 and the surfaces of the walls of the sleeve cavities are associated conformable alignment surfaces which are intended to cause desired positioning of the plugs when the end portions of the plugs are received in the sleeve 60. When disposed in the alignment sleeve 60, the plugs should have a desired end separation.

What we claim is:

1. A method of incorporating an optical element having two opposed optical end faces into an optical system having a first connector plug which terminates an optical fiber, a second connector plug which terminates another optical fiber, and an alignment adapter having a first port for receiving the first connector plug and a second port for receiving the second connector plug, the first and second plug end faces being engageable with one another in an aligned, locked position within the alignment adapter, the method comprising the steps of:

applying an adhesive to at least one of an end face of the optical element and an end face of one of the connector plugs the optical element is to be joined with; and, joining the end face of the optical element with the end face of the connector plug so that the optical element completely covers an optical fiber that terminates at the connector plug end face, the adhesive joining the end face of the connector plug to the end face of the optical element so that the optical element is carried by the connector plug.

2. The method as defined in claim 1 further comprising the step of:

connecting the first and second connector plugs to their respective receiving ports of the alignment adapter so that the first and second plugs are in a releasably locked position, the second side of the optical element being abutted against an end of the second connector plug.

3. A method as defined in claim 1 wherein the step of applying an adhesive includes applying a gel having predetermined optical characteristics to at least one of the first connector plug and a face of the optical element, to affix the optical element to the first connector end.

4. An optical connector for modifying a characteristic of a signal propagating therethrough, comprising:

a first optical connector plug for terminating a first optical fiber at an end face of the connector plug;

a second optical connector plug for terminating a second optical fiber at an end face of the second connector plug;

an alignment member aligning the first and second optical connector plugs and for coupling the connector plug end faces to one another; and, a substantially planar optical element having two end faces, one of the end faces being affixed with an adhesive to an end face of the first connector plug for modifying a characteristic of a signal propagating therethrough, said optical element being carried by the first connector plug.

5. An optical connector as defined in claim 4 having a gel intermediate the first connector plug and the planar optical element to removeably affix the optical element to the end of the first connector.

6. An optical connector as defined in claim 4, wherein the first connector plug end and the planar optical element are permanently glued to one another.

7. An optical connector as defined in claim 6 wherein the planar optical element is a cylindrical disk.

8. A kit comprising:

an optical fiber having a connector plug disposed at one end;

an other optical fiber having an other connector plug disposed at one end;

a plurality of optical elements suitable for affixing to an end of a connector plug; and, an adhesive for affixing one of the optical elements to the end of one of the connector plugs.

9. A method of incorporating an optical element into an optical system having a first connector plug which terminates an optical fiber, a second connector plug which terminates another optical fiber, and an alignment adapter having a first port for receiving the first connector plug and a second port for receiving the second connector plug, the first and second plug end faces being engageable with one another in an aligned, releasably locked position within the alignment adapter, the method comprising the step of:

depositing a non-removable coating of in the form of a thin film optical element onto an end face of the first connector plug.

* * * * *